US008120858B2

(12) United States Patent  (10) Patent No.: US 8,120,858 B2
Choi et al.  (45) Date of Patent: Feb. 21, 2012

(54) MICRO LENS, METHOD AND APPARATUS FOR MANUFACTURING MICRO LENS, AND CAMERA MODULE INCLUDING MICRO LENS

(75) Inventors: Min-seog Choi, Seoul (KR); Eun-sung Lee, Daejeon-si (KR); Kyu-dong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 12/537,283

(22) Filed: Aug. 7, 2009

(65) Prior Publication Data
US 2010/0142061 A1   Jun. 10, 2010

(30) Foreign Application Priority Data

Dec. 4, 2008 (KR) ........................ 10-2008-0122552

(51) Int. Cl.
*G02B 3/00* (2006.01)
*G02B 27/10* (2006.01)
*B29D 11/00* (2006.01)
(52) U.S. Cl. .......................... 359/642; 359/619; 264/2.5
(58) Field of Classification Search .......... 359/619–623, 359/642, 811–823; 264/1.32, 1.34, 1.9, 132, 264/2.5
See application file for complete search history.

(56) References Cited

U.S. PATENT DOCUMENTS

| | | | |
|---|---|---|---|
| 5,880,879 A | 3/1999 | Foo | 359/356 |
| 6,618,201 B2 * | 9/2003 | Nishikawa et al. | 359/619 |
| 6,850,368 B2 * | 2/2005 | Shimizu et al. | 359/619 |
| 6,933,584 B2 | 8/2005 | Miyazaki et al. | 257/432 |
| 6,949,808 B2 | 9/2005 | Harazono | 257/433 |
| 7,019,375 B2 | 3/2006 | Harazono | 257/433 |
| 7,042,645 B2 * | 5/2006 | Houlihan et al. | 359/619 |
| 7,336,430 B2 | 2/2008 | George et al. | 359/708 |
| 7,391,458 B2 | 6/2008 | Sakamoto | 348/340 |
| 7,525,732 B2 * | 4/2009 | Uehara et al. | 359/620 |

(Continued)

FOREIGN PATENT DOCUMENTS

EP   1 413 900 A2   4/2004

(Continued)

OTHER PUBLICATIONS

Kolodziejczyk, A. et al., "The light sword optical element—a new diffraction structure with extended depth of focus", Journal of Modern Optics, 1990, pp. 1283-1286, vol. 27, No. 8.

(Continued)

*Primary Examiner* — Mohammed Hasan
(74) *Attorney, Agent, or Firm* — Sughrue Mion, PLLC

(57) ABSTRACT

Micro lens manufacturing apparatus, a micro lens manufacturing method, a micro lens, and a camera module employing the micro lens are provided. First mold is manufactured in correspondence with a first lens profile of a lens element. Second mold is manufactured in correspondence with a second lens profile of the lens element. Second mold is aligned on a surface of a lens substrate having a hollow hole formed thereon. Material for the lens element is supplied into the hollow hole of the lens substrate. First mold is aligned on the other surface of the lens substrate having the hollow hole and compressed to form the first and second profiles of the lens element. Formed lens element hardened. First and second molds are separated from each other. Therefore, time and cost for manufacturing the micro lens are reduced, and the accurate alignment between the first and second lens profiles is achieved.

20 Claims, 11 Drawing Sheets

U.S. PATENT DOCUMENTS

| | | | |
|---|---|---|---|
| 7,633,544 B2 | 12/2009 | Woo et al. | 348/345 |
| 7,817,359 B2 * | 10/2010 | Tsai | 359/822 |
| 2003/0090987 A1 | 5/2003 | Kitahara et al. | |
| 2003/0157211 A1 | 8/2003 | Tsunetomo et al. | |
| 2004/0090571 A1 | 5/2004 | Fujita | |
| 2005/0074702 A1 | 4/2005 | Lee et al. | |
| 2005/0271375 A1 | 12/2005 | Watanabe et al. | |
| 2006/0126180 A1 | 6/2006 | Jung et al. | |
| 2007/0046862 A1 | 3/2007 | Umebayashi et al. | |
| 2008/0100934 A1 | 5/2008 | Webster et al. | |
| 2008/0121784 A1 | 5/2008 | Chang et al. | |
| 2008/0123199 A1 | 5/2008 | Hong | |

FOREIGN PATENT DOCUMENTS

| | | |
|---|---|---|
| EP | 1 443 754 A2 | 8/2004 |
| JP | 2000-66097 A | 3/2000 |
| JP | 2000301550 A | 10/2000 |
| JP | 2001-83414 A | 3/2001 |
| JP | 2003-86779 A | 3/2003 |
| JP | 2003-140036 A | 5/2003 |
| JP | 2003-179217 A | 6/2003 |
| JP | 2003211462 A | 7/2003 |
| JP | 2004-40287 A | 2/2004 |
| JP | 2004-61623 A | 2/2004 |
| JP | 2004163695 A | 6/2004 |
| JP | 2005-333170 A | 12/2005 |
| JP | 2006-45029 A | 2/2006 |
| JP | 2007025297 A | 2/2007 |
| JP | 2007-65126 A | 3/2007 |
| JP | 2008-129606 A | 6/2008 |
| KR | 1020050010343 A | 1/2005 |
| KR | 1020050033987 A | 4/2005 |
| KR | 10-2005-0064560 A | 6/2005 |
| KR | 1020060070813 A | 6/2006 |
| KR | 10-0647299 B1 | 11/2006 |
| KR | 10-0691268 B1 | 3/2007 |
| KR | 10-2008-0072333 A | 8/2008 |
| KR | 10-2008-0099031 A | 11/2008 |
| KR | 10-2009-0037684 A | 4/2009 |
| WO | 2005008780 A1 | 1/2005 |
| WO | 2008/011003 A2 | 1/2008 |
| WO | 2008/133946 A1 | 11/2008 |

OTHER PUBLICATIONS

Mikula, G. et al., "Imaging with extended focal depth by means of lenses with radial and angular modulation", Optics Express, Jul. 2007, pp. 9184-9193, vol. 15, No. 15.

Mikula, G. et al., "Diffractive elements for imaging with extended depth of focus", Optical Engineering, May 2005, pp. 058001-1-058001-7, vol. 44, No. 5.

Davidson, N. et al., "Holographic axilens: high resolution and long focal depth", Optical Society of America, 1991, pp. 523-525, vol. 16, No. 7.

Extended European Search Report issued Jul. 29, 2010 in counterpart European Application No. 10160047.6.

* cited by examiner

MICRO LENS, METHOD AND APPARATUS FOR MANUFACTURING MICRO LENS, AND CAMERA MODULE INCLUDING MICRO LENS

CROSS REFERENCE TO RELATED APPLICATION

This application claims the benefit under 35 U.S.C. §119(a) of Korean Patent Application No. 10-2008-122552, filed on Dec. 4, 2008, the disclosure of which is incorporated herein in its entirety by reference.

BACKGROUND

1. Field

The following description relates to a micro lens, a method and apparatus for manufacturing the micro lens, and a camera module employing the micro lens, which is applicable to a small imaging device such as a mobile phone.

2. Description of the Related Art

In a conventional method of manufacturing a micro lens having both surfaces with lens profiles, an ultraviolet curable material is coated on a top surface of a transparent lens substrate, the ultraviolet curable material of the top surface of the lens substrate is compressed with a metal mold to reproduce a shape of the metal mold, and the curable material on the top surface of the lens substrate is hardened by applying ultraviolet rays from a bottom surface of the lens substrate. Then, the bottom surface of the lens substrate is coated with an ultraviolet curable material, the ultraviolet curable material of the bottom surface is pressed with a metal mold to reproduce a shape of the metal mold, and then curable material to the bottom surface of the lens substrate is hardened by applying ultraviolet rays from the top surface of the lens substrate.

However, in such manufacturing method, during the hardening of the ultraviolet curable material of the bottom surface of the lens substrate, a lens on the top surface which has been already formed focuses ultraviolet rays, resulting in uneven hardening of the lens surface and hindering the acquisition of an precise shape of the lens.

In another conventional micro lens manufacturing method, a first metal mold having a first lens profile which is to be formed on a top surface of the lens substrate is manufactured, a transparent first soft mold is provided to the first metal mold to firstly reproduce the first lens profile, and a lens element material is coated on the top surface of the lens substrate and then compressed with the first soft mold to secondly reproduce the first lens profile to form a final lens profile. Then, a second metal mold having a second lens profile which is to be formed on a bottom surface of the lens substrate is manufactured, a transparent second soft mold is provided to the second metal mold to firstly reproduce the second lens profile, and a lens element material is coated on a bottom surface of the lens substrate and then compressed with the second soft mold to secondly reproduce the second lens profile to finally form the lens profile on the bottom surface of the lens substrate.

However, the above manufacturing method has difficulties in compensation in relation with shrinkage of a metal mold or a lens substrate and accurate alignment of the lens elements between the top surface and the bottom surface of the lens substrate.

Meanwhile, since there is interposed the lens substrate with a reflective power of zero between the top lens element and the bottom lens element, the overall thickness of the micro lens becomes inevitably thick.

When a plurality of micro lenses manufactured by any of the above conventional methods is employed to a camera module, the micro lenses are arranged at a predetermined distance from one another. To maintain an accurate distance between neighboring micro lenses, spacers formed of, e.g. a silicon material are provided between the micro lenses. Each of the spacers is manufactured according to an additional method which is not associated with the micro lens manufacturing method. For this reason, an additional cost for manufacturing the spacers is required, thereby increasing the cost and time for manufacturing the camera module.

SUMMARY

Accordingly, in one aspect, there are provided a micro lens manufacturing apparatus and a micro lens manufacturing method which is possible to form lens elements on both surfaces of a lens substrate with a single hardening process, and the micro lens, and a camera module employing the micro lens.

Also, in another aspect, there are provided a micro lens manufacturing apparatus and a micro lens manufacturing method which is possible to form a micro lens which has an overall thin thickness, accurately aligned lens elements on respective surfaces of the micro lens and no need to include spacers for a camera module, and the micro lens, and a camera module employing the micro lens.

According to another aspect, there is provided a method of manufacturing a micro lens including manufacturing a first mold to fit a first lens profile of a lens element, manufacturing a second mold to fit a second lens profile of the lens element, aligning the second mold on a surface of a lens substrate having a hollow hole, supplying a material for the lens element into the hollow hole on the lens surface, forming the first and second profiles of the lens element by aligning the first mold on the other surface of the lens substrate which does not have the hollow hole and applying a pressure onto the first mold, hardening the molded lens element, and separating the first mold and the second mold from each other.

According to still another aspect, there is provided an apparatus for manufacturing a micro lens having a lens substrate with a hollow hole and a lens element penetrating through the hollow hole and having two surfaces, each having a lens profile, the apparatus including a first mold, a second mold, a molding unit, and a hardening unit.

The first and second molds are disposed to face each other, while the lens substrate is interposed therebetween, and each of the first and second molds has a lens substrate facing surface corresponding to the lens profile of the lens element.

The molding unit molds a lens element material injected between the first and second molds into the lens element having predetermined lens profiles.

The hardening unit is disposed between the first and second molds to harden the molded lens element.

According to yet another aspect, there is provided a micro lens includes a lens substrate and a lens element.

The lens substrate has a hollow hole formed thereon. The lens element has a first primary lens functioning portion and a second primary lens functioning portion, each of which penetrates through the hollow hole of the lens substrate and is formed at each end of the hollow hole.

According to another aspect, there is provided a camera module including a plurality of micro lenses stacked one another, and a wafer-level photographing device to process images input through the micro lenses.

At least one of the micro lenses includes a lens substrate with a hollow hole and a lens element formed penetrating through the hollow hole of the lens substrate.

The lens element includes a first primary lens functioning portion and a second primary lens functioning portion, each of which has a diameter the same as or smaller than a diameter of the hollow hole and is disposed at each end of the hollow hole. A spacer portion extends from at least one of the first primary lens functioning portion and the second primary lens functioning portion to protrude from at least one surface of the lens substrate. The stacked micro lenses are spaced from one another by the spacer portion.

Other aspects will become apparent to those skilled in the art from the following detailed description, which, taken in conjunction with the attached drawings, discloses exemplary embodiments of the invention.

BRIEF DESCRIPTION OF THE DRAWINGS

FIGS. 3A to 3E are cross-sectional views illustrating procedures of manufacturing a first mold.

FIGS. 4A to 4E are drawings illustrating cross-sectional views showing procedures of manufacturing a second mold.

FIG. 5 is a diagram illustrating a cross-sectional view showing a procedure of aligning a lens substrate on a second mold.

FIG. 6 is a diagram illustrating a cross-sectional view showing a procedure of supplying a lens element material into between a first mold and a second mold.

FIG. 7 is a diagram illustrating a cross-sectional view showing a procedure of forming and hardening a lens element.

FIG. 8 is a diagram illustrating a cross-sectional view showing a procedure of separating a first mold and a second mold.

Elements, aspects, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves those of ordinary skill in the art. Descriptions of well-known functions and structures are omitted to enhance clarity and conciseness.

Figure 1:
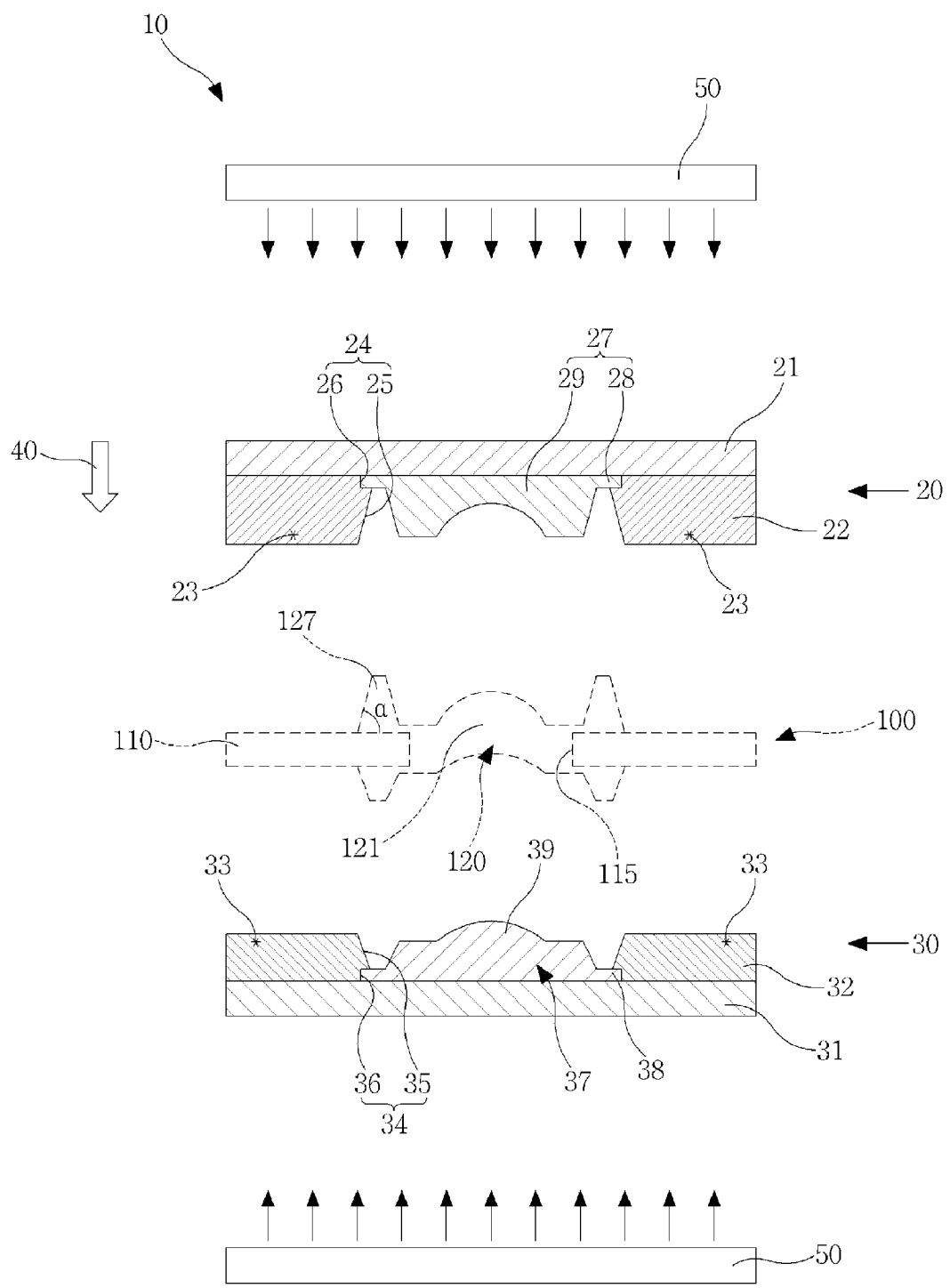
FIG. 1 is a diagram illustrating an exemplary micro lens manufacturing apparatus.

FIG. 1 is a diagram illustrating an exemplary micro lens manufacturing apparatus 10. The micro lens fabricating apparatus 10 is to fabricate a micro lens 100 which includes a lens substrate 110 having a hollow hole 115 and a lens element 120 penetrating through the hollow hole 115 and with two surfaces, each having a lens profile.

The size of the micro lens 100 may be suitable for a wafer-level package.

As shown in FIG. 1, the micro lens manufacturing apparatus 10 includes a first mold 20, a second mold 30, a molding unit (not shown) which applies pressure in the direction 40, and hardening units 50.

The first mold 20 includes a first base substrate 21, a first mold substrate 22 for molding, and a first lens mold 27 for molding.

The first base substrate 21 supports the first mold substrate 22 for molding and the first lens mold 27 for molding. The first bases substrate 21 may be a transparent substrate such as a glass or a quartz substrate, or an opaque substrate. The first base substrate 21 may be formed of a material allowing ultraviolet rays to pass therethrough.

The first mold substrate 22 for molding is attached to a surface of the first base substrate 21 adjacent to the first lens mold 27. A first lens mold accommodating hole 24 for accommodating the first lens mold 27 is formed on the surface of the first mold substrate 22. The first lens mold accommodating hole 24 are formed to correspond to the hollow hole 115 of the lens substrate 110.

The first lens mold 27 is inserted into the first lens mold accommodating hole 24, and attached to the first base substrate 21. The first lens mold 27 has a shape corresponding to the first lens profile of the micro lens 100. In this case, the first lens mold 27 may be divided into a bottom portion 28 resting in the first lens mold accommodating hole 24 and a body portion 29 having a shape opposite to the lens profile of the micro lens. The first lens mold accommodating hole 24 may include two portions stepped with respect to each other, a bottom hole portion 26 in which the bottom portion 28 rests and a body hole portion 25 which accommodates the body portion 29.

The second mold 30 includes a second base substrate 31, a second mold substrate 32, and a second lens mold 37.

The second base substrate 31 supports the second mold substrate 32 and the second lens mold 37. The second base substrate 31 may be formed of the same material as the first base substrate 21.

The second mold substrate 32 is attached to the second base substrate 31. In this case, a second lens mold accommodating hole 34 is formed on the second mold substrate 32. The second lens mold accommodating hole 34 is formed to correspond to the hollow hole 115 of the lens substrate 110.

The second lens mold 37 is inserted into the second lens mold accommodating hole 34, and attached to the second base substrate 31. The second lens mold 37 has a shape corresponding to a shape of a second lens profile of a completely formed micro lens 100. The second lens mold 37 may be divided into a bottom portion 38 resting in the second lens mold accommodating hole 34 and a body portion 39 for molding the lens element 120 of the micro lens 100. The second lens mold accommodating hole 34 may include a bottom hole portion 36 in which the bottom portion 38 rests and a body hole portion 35 which accommodates the body portion 39, and the bottom hole portion 36 and the body hole portion 35 are formed to be stepped with respect to each other.

The lens substrate 110 rests on at least one of the first mold 20 and the second mold 30. In drawings (e.g., FIG. 6), as an example, the lens substrate 110 is resting on the second mold substrate 32.

The molding unit applies a pressure in the direction 40 on a material for the lens element 120 injected between the first mold 20 and the second mold 30 to form the lens element 120.

That is, the molding unit applies a pressure in the direction 40 on the material for the lens element 120 on the second lens mold 37 of the second mold 30 so that the liquid material for the lens element 120 is formed following the contours of the first lens mold 27 and the second lens mold 37. In this case, insertion of a lens and hardening by pressure may be performed in a vacuum environment to appropriately fill a space between the first and second molds 20 and 30 and a spacer area with material for the lens element 120.

The hardening unit 50 hardens the lens element 120 formed between the first and second molds 20 and 30. The hardening unit 50 may be an ultraviolet hardening unit, and the lens element 120 may be formed of a material that can be hardened by ultraviolet light.

The molding unit and the hardening unit 50 may operate so simultaneously that the hardening of the micro lens can coincide with the formation.

The micro lens manufacturing apparatus 10 is possible to fabricate a micro lens by applying pressure between the first and second molds 20 and 30 simultaneously. To this end, the hardening unit 50 may harden both sides of the lens element 120 at the same time. For example, the hardening unit 50 may be an ultraviolet hardening unit and apply ultraviolet light from the outside of the first mold 20 and the outside of the second mold 30 toward the inside of the first and second molds 20 and 30. In this case, each of the first mold substrate 22 and the second mold substrate 32 is formed of a material that allows ultraviolet light to pass therethrough, and the lens element 120 is formed of an ultraviolet curable polymer material.

As the result, the overall time for manufacturing the micro lens can be reduced. In addition, the lens profile on each side of the lens substrate 110 is formed and hardened simultaneously, and thus there are no differences in positioning and form accuracy between the first and second lens profiles.

The lens element 120 may include a primary lens functioning portion 121 and a spacer portion 127. The primary lens functioning portion 121 and the spacer portion 127 are formed integrally. The primary lens functioning portion 121 is for primary functions of the lens including collection and/or diffusion of light. The spacer portion 127 adjusts a distance between either side of the micro lens and an adjoining micro lens.

In the case of a camera module, conventionally, a plurality of lenses are stacked with one another and additional spacers are located between neighboring lenses to maintain a predetermined distance. The spacer is a silicon wafer such as glass or silicon.

However, in the exemplary embodiment, an additional spacer is not manufactured separately, but the spacer portion 127 integrated with the primary lens functioning portion 121 is manufactured in concurrence with the primary lens functioning portion 121, so that a predetermined distance between lenses can be maintained without additional spacers in a camera module having lenses stacked with one another.

To position the spacer portion on a side of the lens element 120, a space between an outer surface of the first lens mold 27 and an inner surface of the first lens mold accommodating hole 24 may have a shape corresponding to a first spacer portion of a completely formed micro lens. That is, if the body hole portion 25 of the first mold substrate 22 is formed to become gradually wider as the distance from the body hole portion 25 to the micro lens increases and the outer surface of the first lens mold 27 is formed to be gradually tapered as the distance from the first lens mold 27 to the micro lens increases, a space for the spacer portion 127 is obtained between the body hole portion 25 and the first lens mold 27, and the obtained space is filled with the material for the lens element 120 by the molding unit to form the first spacer portion 127. In the same manner, a space between the outer surface of the second lens mold 37 and the inner surface of the second lens mold accommodating hole 34 may have a shape the same as the shape of a second spacer portion of the completely formed micro lens so as to form a spacer portion on the other side of the lens element 120. In this case, surface processing and establishment of a vacuum environment may be required to fill a narrow space of the spacer portion smoothly and appropriately.

If the spacer portion 127 is integrated with the primary lens functioning portion 121 by direct molding process, a range of a profile slope α may be limited, for example, to be below about 35 degrees in consideration of a draft angle. Unlike the direct molding process, the micro lens manufacturing apparatus 10 in the exemplary embodiment performs processes of effective diameter of a lens and of the spacer portion 170 separately, and forms the spacer portion 127 by the mold lens and the mold substrate, so that the lens profile is not substantially restricted. Hence, the size of the lens can be more minimized.

A surface of each of the first mold substrate 22 and the second mold substrate 32 which is adjacent to the micro lens has an alignment mark 23 (on the first mold substrate 22) or 33 (on the second mold substrate 32) formed thereon for alignment with the lens substrate 110.

The alignment mark 33 located on the surface of the second mold substrate 32 is for the lens substrate 110 to rest at an accurate position on the second mold substrate, and the alignment mark 23 located on the surface of the first mold substrate 22 is for the first mold substrate 22 to be aligned with the lens substrate 110 at an accurate position.

Figure 2:
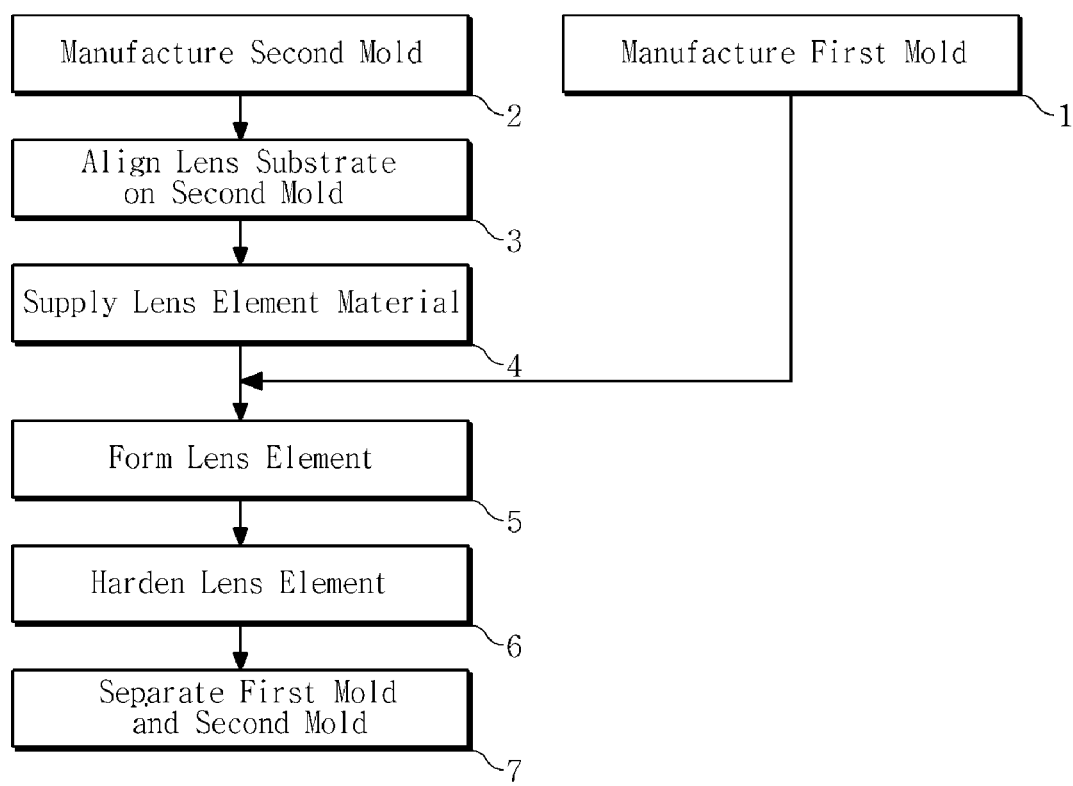
FIG. 2 is a flowchart illustrating an exemplary method of manufacturing a micro lens by the micro lens manufacturing apparatus of FIG. 1.

FIG. 2 is a flowchart illustrating an exemplary method of manufacturing a micro lens by the micro lens manufacturing apparatus 10 of FIG. 1.

As shown in FIGS. 1 and 2, the first mold 20 is formed in correspondence to the first lens profile of the lens element 120 (operation 1), and the second mold 30 is formed in correspondence to the second lens profile of the lens element 120 (operation 2). Following the forming of the second mold 30, the lens substrate 110 having the hollow hole 115 is aligned on a surface of the second mold 30 (operation 3), the material for the lens element 120 is supplied into the hollow hole 115 of the lens substrate 110 (operation 4), and the first and second lens profiles of the lens element 120 are formed (operation 5). Following the formation of the first and second lens profiles, the lens element 120 is hardened (operation 6), and the first mold 20 and the second mold 30 are separated from each other (operation 7).

According to the above micro lens manufacturing method, the lens substrate 110 is not interposed in the primary lens functioning portion 121, thereby reducing the thickness of a lens and allowing the first and second lens profiles to be formed substantially concurrently, i.e., at substantially the same time, which results in reduction of the manufacturing time.

FIGS. 3A to 3E, 4A to 4E, and 5 to 8 are diagrams illustrating procedures of an exemplary method of manufacturing a micro lens. To manufacture the micro lens according to the exemplary embodiment, as shown in FIGS. 3A to 4E, procedures for molding each of the first mold 20 and the second mold 30 are performed.

The procedures of molding the first mold 20 in correspondence to the first lens profile of the lens element 120 are shown in FIGS. 3A to 3E.

Figure 3A:
FIGS. 3A to 3E, 4A to 4E, and 5 to 8 are diagrams illustrating cross-sectional views showing procedures of an exemplary method of manufacturing a micro lens.
Figure 3B:
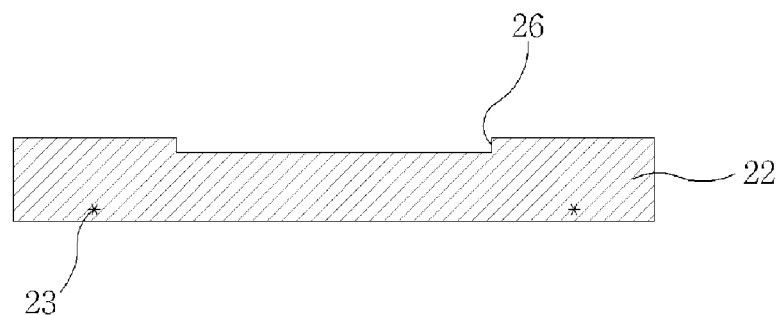
Figure 3C:
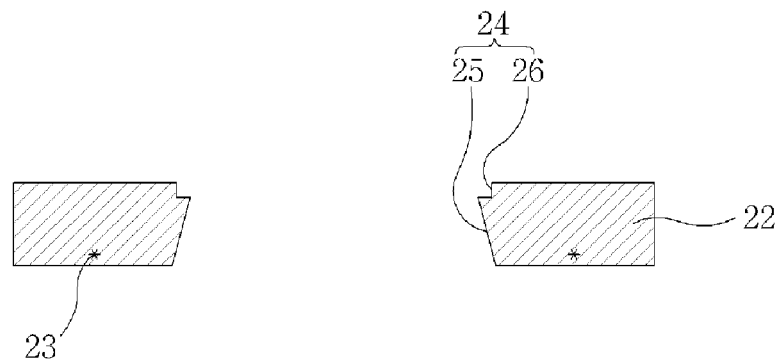
Figure 3D:
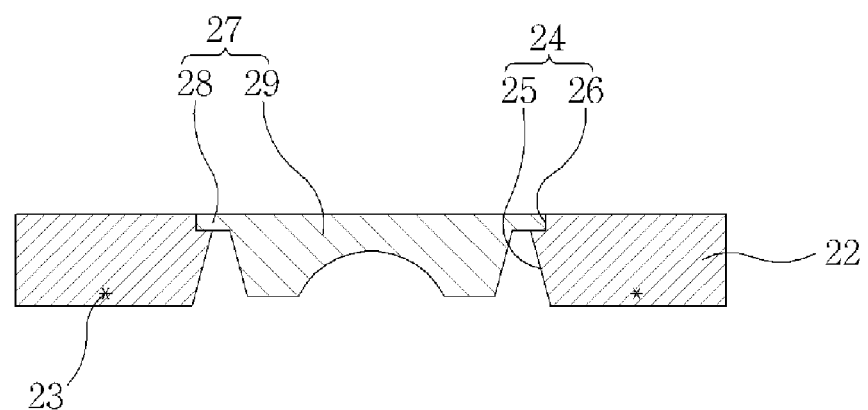
Figure 3E:
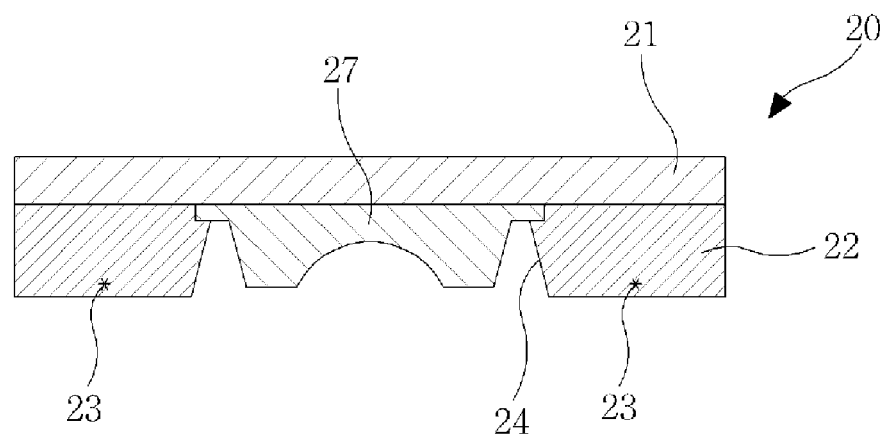

To fabricate the first mold 20, the first mold substrate 22 is provided as shown in FIG. 3A, and the first lens mold accommodating hole 24 is formed on the first mold substrate 22 as shown in FIGS. 3B and 3C. The first lens mold 27 corresponding to the first lens profile of the micro lens is aligned in the first lens mold accommodating hole 24 as shown in FIG. 3D, and the first base substrate 21 is joined to the first mold substrate 22 and a bottom surface of the first lens mold 27 as shown in FIG. 3E.

Here, the first mold substrate 22 may be a silicon or glass substrate. Moreover, the first mold substrate 22 may be formed of a transparent or opaque material. The first mold substrate 22 may be formed of various materials according to a method of hardening the material of the lens element 120, as will be described later.

In forming the first lens mold accommodating hole 24 on the first mold substrate 22, as shown in FIG. 3B, a first bottom hole portion 26 is formed inward from the bottom surface of the first mold substrate such that a bottom portion 28 (see FIG. 3D) of the second lens mold 27 (see FIG. 3D) is inserted and rests in the first bottom hole portion 26. The first body hole portion 25 is formed inward from a surface of the first mold substrate 22 which faces a lens to penetrate the first mold substrate 22 and is stepped with respect to the first bottom hole portion 26 such that the body portion 29 (see FIG. 3D) of the first lens mold 27 (see FIG. 3D) can be accommodated in the first body hole portion 25.

In aligning the first lens mold 27 in the first lens mold accommodating hole 24, a space between an outer surface of the first lens mold 27 and an inner surface of the first lens mold accommodating hole 24 may be formed to have the same shape as the shape of the first spacer portion of a completely formed micro lens.

The first mold substrate 22 may include at least one alignment mark 23 to help align the first mold substrate with the lens substrate accurately. The alignment mark 23 may be formed on the first mold substrate 22 in one of procedures shown in FIGS. 3B to 3E.

In addition, the second mold 30 is manufactured in correspondence with the second lens profile of the lens element 120 as shown in FIG. 4A to 4E.

Figure 4A:

More specifically, as shown in FIG. 4A, the second mold substrate 32 is provided. The second mold substrate 32 may be a silicon or glass substrate. Additionally, the second mold substrate 32 may be formed of a transparent or opaque material, and may be formed of various types of materials according to a method of hardening the material for the lens element, as will be described later.

Figure 4B:
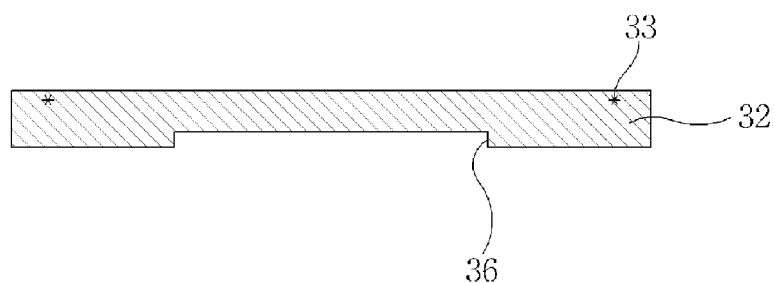
Figure 4C:
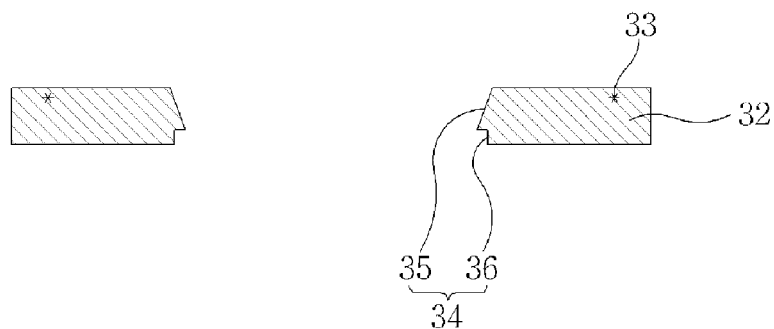

Following the providing of the second mold substrate 32, the second lens mold accommodating hole 34 is formed on the second mold substrate 32 as shown in FIGS. 4B and 4C.

The second lens mold accommodating hole 34 may be formed to have at least one step. The second lens mold accommodating hole 34 is a space where the second lens mold 37 (see FIG. 4D) is inserted and aligned and the material for the lens element 120 is injected.

Here, the second lens mold accommodating hole 34 may be formed to have at least one step. To this end, in forming the second lens mold accommodating hole 34, as shown in FIG. 4B, a second bottom hole portion 36 is formed so as to accommodate and support a bottom surface of the second lens mold 37 (see FIG. 4D), and as shown in FIG. 4C, a second body hole portion 35 is formed, into which the body portion 39 (see FIG. 4D) of the second lens mold 37 (see FIG. 4D) is inserted.

In this case, the second bottom hole portion 36 is formed by etching a part of the bottom surface of the second mold substrate 32, and the second body hole portion 35 may be formed by etching an opposite surface of the second mold substrate 32 which faces the lens or sand blast method. A diameter of the second bottom hole portion 36 may be wide enough to safely support the bottom portion 38 (see FIG. 4D) of the second lens mold 37 (see FIG. 4D), the second body hole portion 35 may be formed to accommodate the body portion 39 (see FIG. 4D) of the second lens mold 37, and the second bottom hole portion 36 and the second body hole portion 35 may be formed to be stepped with respect to each other. Here, to form the spacer portion 127 (see FIG. 8), the second body hole portion 35 may be gradually tapered as it becomes closer to the lens.

Figure 4D:
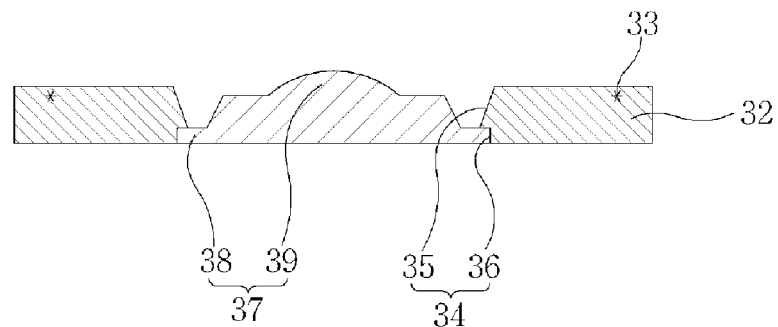

Then, as shown in FIG. 4D, the second lens mold 37 is aligned in the second lens mold accommodating hole 34. The second lens mold 37 includes the body portion 39 and the bottom portion 38. The body portion 39 has the opposite shape of the second lens profile of a lower lens element 120, and the bottom portion 38 rests in the second bottom hole portion 36.

The second lens mold 37 is inserted from the bottom surface of the second lens mold accommodating hole 34, the bottom portion 38 of the second lens mold 37 is supported by the second bottom hole portion 36, and the body portion 39 of the second lens mold 37 is inserted into the second body hole portion 35.

A space between the outer surface of the second lens mold 37 and the inner surface of the second lens mold accommodating hole 34 may be used as the spacer portion 127 (see FIG. 8) of the lens element 120, and thus the shapes of the second lens mold 37 and the second lens mold accommodating hole 34 may be formed in correspondence with the shape of the spacer portion 127. Accordingly, the spacer portion can be formed concurrently and integrally with the second primary lens functioning portion.

Figure 4E:
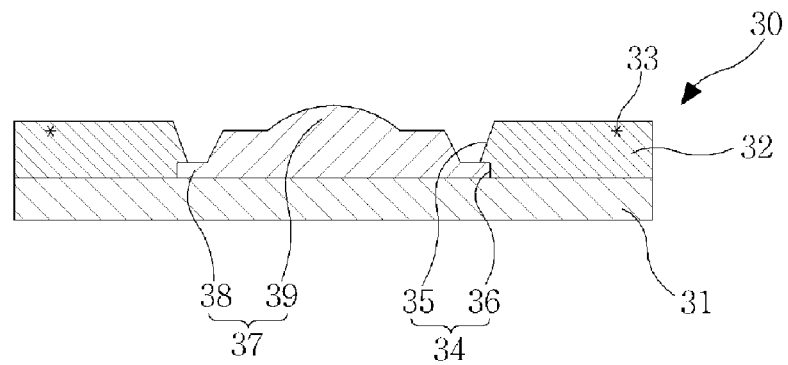

Afterwards, as shown in FIG. 4E, the second base substrate 31 is joined to the bottom surface of the second lens mold 37 and the bottom surface of the second mold substrate 32.

Figure 5:
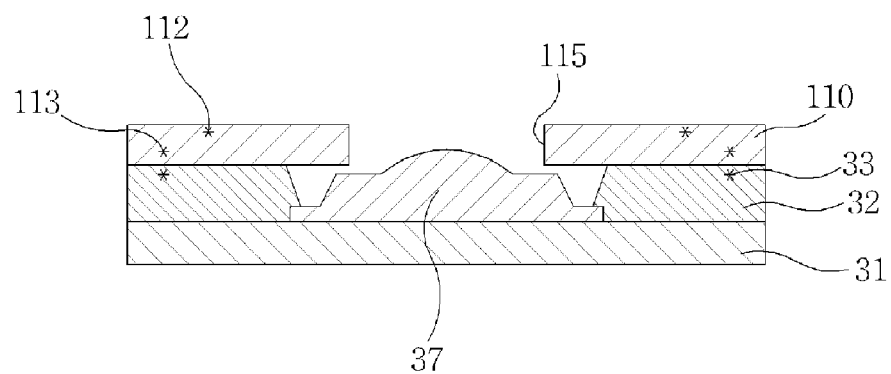

Following the manufacturing of the second mold 30, as shown in FIG. 5, the lens substrate is aligned on the second mold 30, more particularly, on the second mold substrate 32 of the second mold 30. Each of the lens substrate 110 and the second mold substrate 32 may include at least one alignment mark 113 and 33 to help the accurate alignment between the lens substrate 110 and the second mold 30. The alignment mark on the second mold substrate 32 may be formed in one of procedures shown in FIGS. 4B to 4E.

The lens substrate 110 may have the hollow hole 115 formed thereon. The hollow hole 115 may be large to the extent that the hollow hole can enclose the primary lens functioning portion 127 (see FIG. 8) and the spacer portion 127 of a completely formed lens can protrude from the lens substrate 110 outside of the hollow hole 115. As a result, the lens substrate does not extend over the first and second primary lens functioning portions, and thereby the thickness of a lens can be minimized and the spacer portion 127 can be safely supported by the lens substrate 110.

The micro lens may include either or both of a first spacer portion and a second spacer portion.

The lens substrate 110 (see FIG. 5) may include an alignment mark 112 (see FIG. 5) that corresponds to the alignment mark 23 on the first mold substrate 22.

Figure 6:
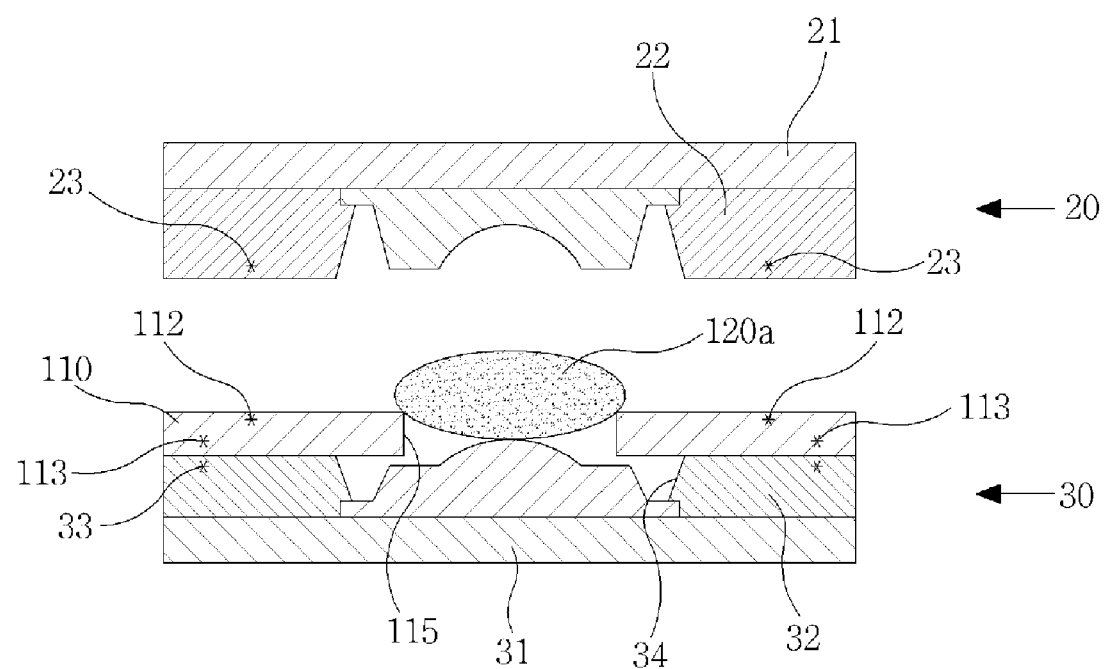

Subsequently, as shown in FIG. 6, a material 120a for the lens element 120 is supplied into the hollow hole 115 of the lens substrate 110. The material 120a for the lens element 120 may be flexible and one of an ultraviolet curable polymer, a glass material and a thermosetting material.

Figure 7:
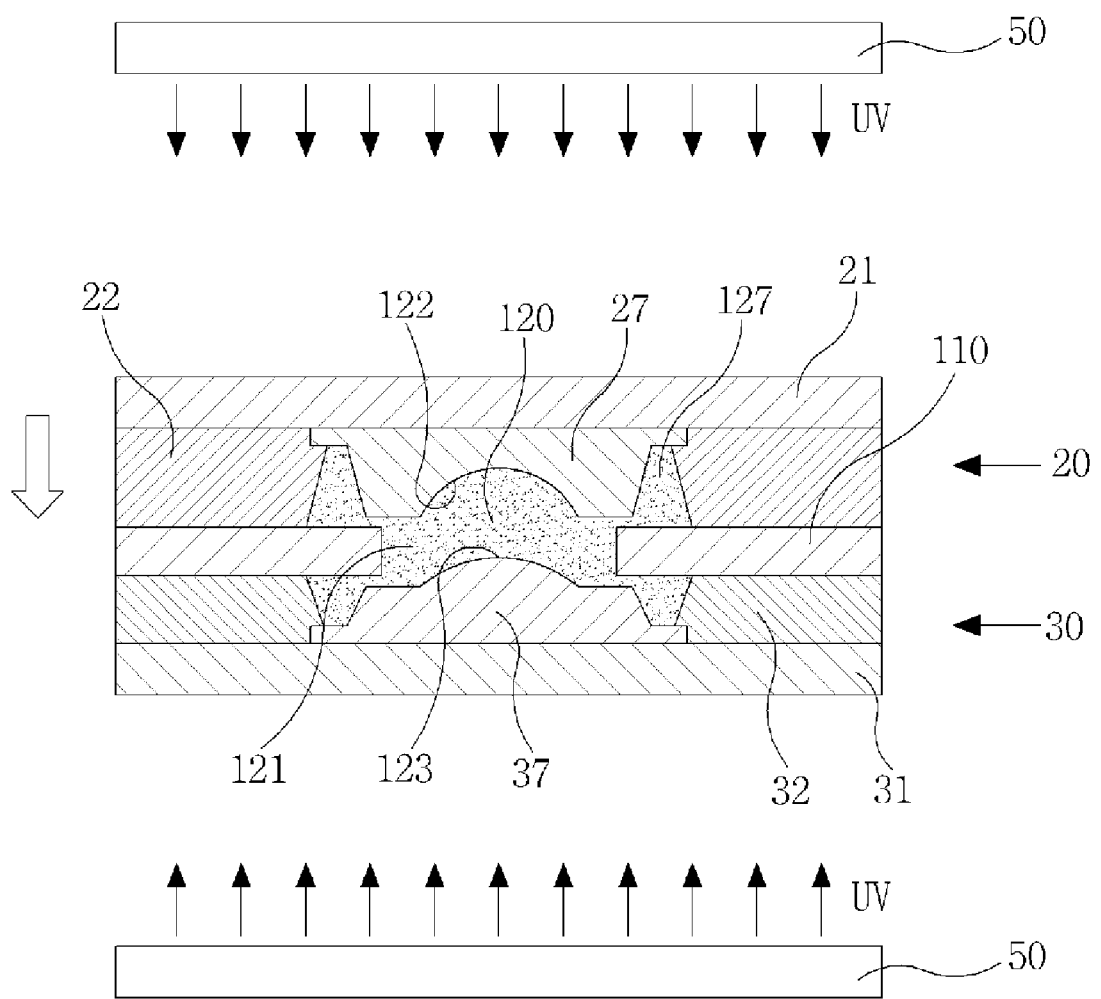

Then, as shown in FIG. 7, pressure is applied between the first mold 20 and the second mold 30 to form the lens element 120. For example, the first mold 20 is moved down and pressure is applied to the first mold 20, the facing second mold 30 and the material 120a for the lens element 120 on the second mold 30 such that the shapes of the first and second mold lenses can be copied as the first and second lens profiles. In this case, in the lens element 120, the primary lens functioning portion 121 is formed concurrently with the spacer portion 127.

Consequently, through the single molding procedure, both lens profiles 122 and 123 are formed concurrently with the spacer portion 127 integrated with the primary lens functioning portion 121.

Additionally, in the molding procedure, the lens element 120 is hardened. The molding of the first and second lens profiles of the lens element 120 may be performed concurrently or sequentially with the hardening of the lens element 120.

As an example of hardening the lens element 120, the hardening unit 50 applies ultraviolet light to a surface of the lens element 120 through the bottom surface of the first mold 20 concurrently with applying the ultraviolet light to the other side of the lens element 120 through the bottom surface of the second mold 30 as shown in FIG. 7. In this case, each of the first base substrate 21 and the second base substrate 31 may be formed of a material that allows ultraviolet light to pass therethrough, and the material for the lens element 120 may be formed of an ultraviolet curable polymer.

In the exemplary embodiment, the lens element 120 may be formed by hardening the first and second lens profiles of the lens element 120 at the same time. From this process, surfaces of the lens can be evenly hardened, and a precise shape of a lens can be obtained.

Figure 8:
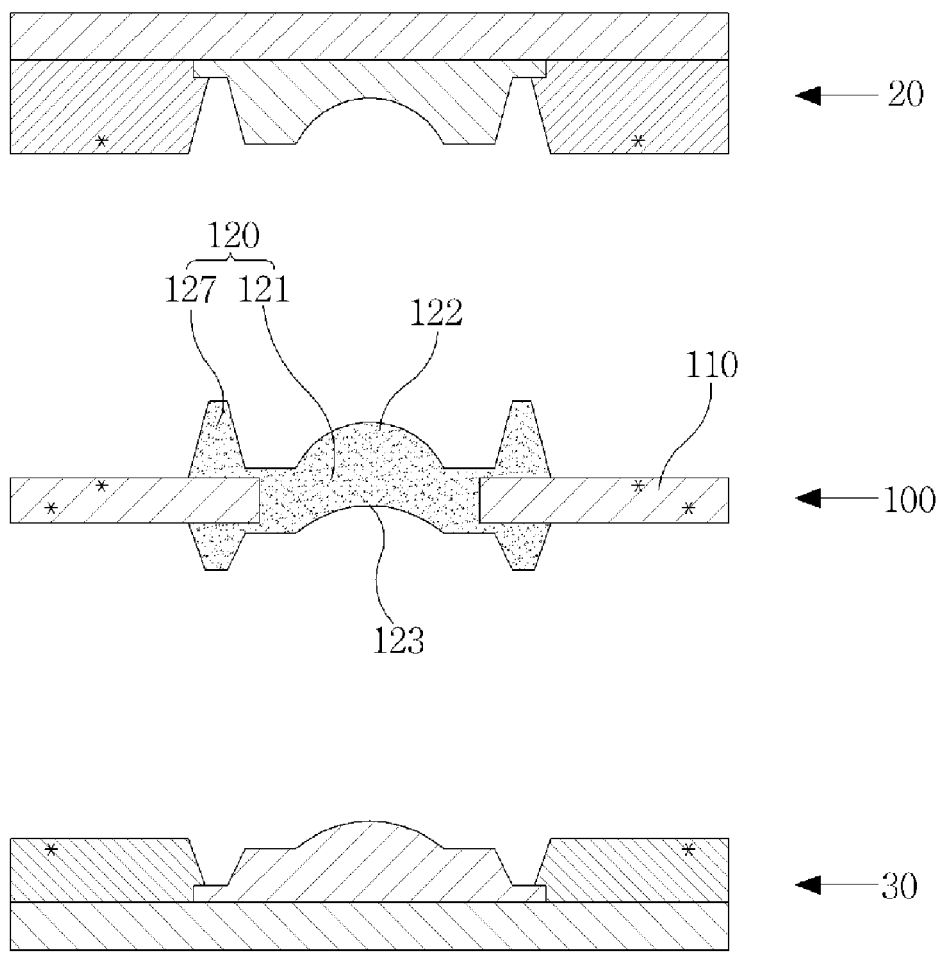

Consequently, as shown in FIG. 8, the first mold 20 and the second mold 30 are separated from each other to complete the micro lens.

Although FIGS. 2 to 8 illustrate a single micro lens as an example, the micro lens manufacturing method is not limited thereto and may include forming a plurality of hollow holes 115 on the lens substrate 110 and providing the first mold 20 and second mold 30 for each hollow hole 115 to form a micro lens array including a plurality of micro lenses formed in sequence.

Figure 9:
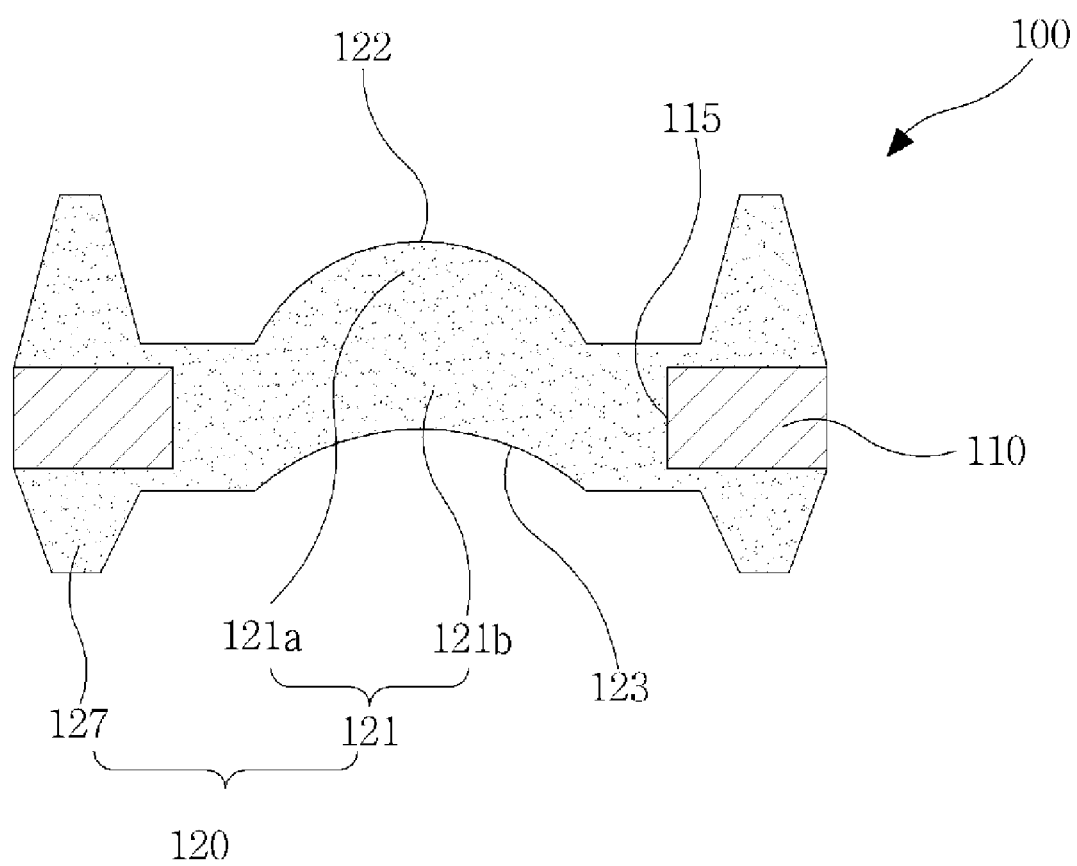
FIG. 9 is a diagram illustrating a cross-sectional view showing an exemplary micro lens.

The micro lens 100 formed by the above manufacturing method includes a lens substrate 110 and a lens element 120 as shown in FIG. 9. The lens substrate 110 includes a hollow hole 115.

The lens element 120 includes a first lens profile 122 and a second lens profile 123 penetrating through the hollow hole 115 to be formed on each side of the hollow hole 115. The lens element 120 includes a primary lens functioning portion 121. The primary lens functioning portion 121 may include a first primary lens functioning portion 121a which is disposed a surface of the lens substrate 110 and the first lens profile 122 is formed on and a second primary lens functioning portion 122b which is disposed at the other surface of the lens substrate 110 and the second lens profile 123 is formed on.

In this case, the lens substrate 110 is not interposed between the first and second primary lens functioning portions 121a and 122b of the lens element 120. As a result, the thickness of a lens is reduced, thereby reducing the overall thickness of a camera module 200 (see FIG. 10) utilizing the lens.

The diameter of each of the first and second primary lens functioning portions 121a and 122b is the same as or smaller than the diameter of the hollow hole 115, the lens substrate 110 may further include a spacer portion 127 molded integrally with the primary lens functioning portion 121. The spacer portion 127 extends from at least one of the first and second primary lens functioning portions 121a and 122b to protrude from at least one surface of the lens substrate 110.

Accordingly, since the spacer portion 127 is molded integrally with the primary lens functioning portion 121, there is no need to manufacture an additional spacer.

The hollow hole 115 of the lens substrate 110 may be formed to enclose the primary lens functioning portion 121 and the spacer portion 127 may be molded to protrude from at least one side of a portion around the hollow hole 115.

Figure 10:
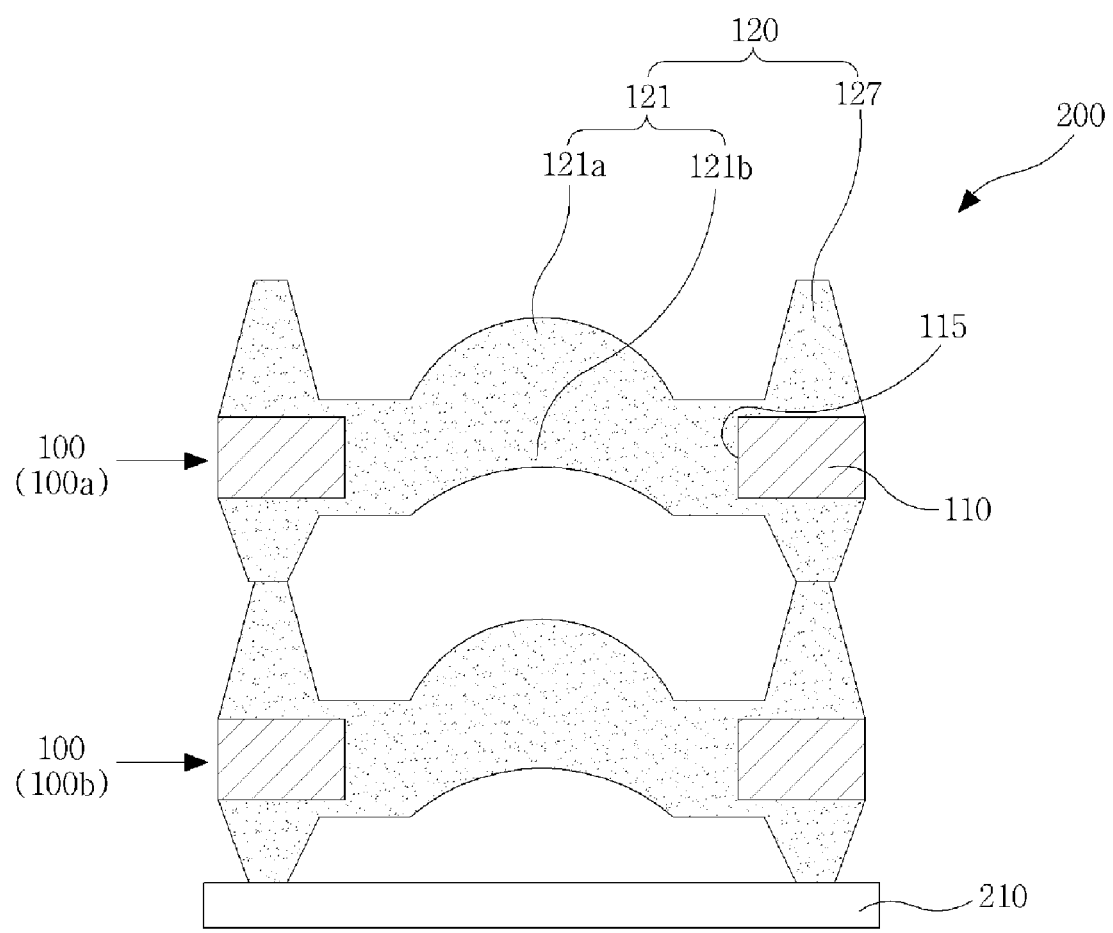
FIG. 10 is a diagram illustrating a cross-sectional view showing an exemplary camera module.

FIG. 10 is a diagram illustrating an exemplary camera module 200 including micro lenses. As shown in FIG. 10, the camera module 200 includes a plurality of micro lenses 100 stacked with one another, and a wafer level photographing device 210 that processes images input through the micro lenses 100. That is, the camera module 200 may be a wafer-level camera module.

At least one of the micro lenses 100a and 100b stacked with each other includes a lens substrate 110 having a hollow hole 115 and a lens element 120 formed penetrating through the hollow hole 115 of the lens substrate 110.

The lens element 120 includes a primary lens functioning portion 121 and a spacer portion 127 which are integrated with each other. The primary lens functioning portion 121 may include a first primary lens functioning portion 121a and a second primary lens functioning portion 121b, each of which has a diameter the same as or smaller than the size of the hollow hole 115 and is disposed at each end of the hollow hole 115. The spacer portion 127 protrude from at least one surface of the lens substrate 110, extending from at least one of the first and second primary lens functioning portions 121a and 121b. In this case, the stacked micro lenses 100a and 100b are separated from each other by the spacer portion 127. Accordingly, the number of elements forming the camera module can be reduced.

According to the above aspect, a lens element is formed on both surfaces of a lens substrate by a single hardening process, and thus the lens manufacturing time and manufacturing cost can be reduced and the accurate alignment between a first lens profile and a second lens profile can be obtained.

Moreover, since there is no lens substrate interposed in a lens element of the micro lens, the overall thickness of the micro lens can be thin.

Furthermore, when the micro lens is employed in a camera module, there is no need to provide an additional spacer, and thus the camera module manufacturing cost and manufacturing time can be reduced.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of manufacturing a micro lens comprising:
   forming a first mold including a first lens profile shape;
   forming a second mold including a second lens profile shape;
   aligning the second mold on one surface of a lens substrate comprising a hollow hole;
   disposing a material at the hollow hole;

aligning the first mold on another surface of the lens substrate which does not have the hollow hole;

applying a pressure onto the disposed material to form a first profile and a second profile on the disposed material, in accordance with the first and the second lens profile shapes of the first and the second molds, respectively, so the disposed material becomes a molded lens element; and hardening the molded lens element to form the micro lens, wherein the first mold comprises a base substrate, a first mold substrate disposed on a surface of the base substrate adjacent to the lens substrate, and a second mold substrate disposed on a surface of the base substrate adjacent to the lens substrate.

2. The method of claim 1, wherein the forming of the first mold comprises:

providing a first mold substrate;

forming a first hole on the first mold substrate; and aligning a first lens mold including the first lens profile shape, into the first hole.

3. The method of claim 2, wherein the forming of the first hole comprises:

forming a first bottom hole portion of the first hole inward from a bottom surface of the first mold substrate to accommodate and support a bottom portion of the first lens mold; and forming a first inserting hole portion of the first hole inward from a lens contacting surface of the first mold substrate to accommodate a body portion of the first lens mold and to be stepped with respect to the first bottom hole portion.

4. The method of claim 2, wherein in the aligning of the first lens mold into the first hole, a space between an outer surface of the first lens mold and an inner surface of the first hole has a same shape as a spacer portion of the micro lens.

5. The method of claim 1, wherein the forming of the second mold including the second lens profile:

providing a second mold substrate;

forming a second hole on the second mold substrate; and aligning a second lens mold including the second lens profile shape, into the second hole.

6. The method of claim 5, wherein the forming of the second hole on the second mold substrate comprises:

forming a second bottom hole portion of the second hole inward from a bottom surface of the second mold substrate for a bottom portion of the second lens mold to be inserted and rest therein; and forming a second inserting hole of the second hole inward from a lens contacting surface of the second mold substrate to accommodate a body portion of the second lens mold and to be stepped with respect to the second bottom hole portion.

7. The method of claim 5, wherein in the aligning of the second lens mold into the second hole, a space between an outer surface of the second lens mold and an inner surface of the second hole has a same shape as a second spacer portion of the micro lens.

8. The method of claim 1, wherein the hardening of the molded lens element comprises applying ultraviolet light to the molded lens element material for hardening.

9. The method of claim 1, wherein the first profile of the molded lens element and the second profile of the molded lens element are formed on the disposed material substantially concurrently.

10. An apparatus for forming a micro lens comprising a lens substrate with a hollow hole and a lens element penetrating through the hollow hole and having two surfaces with lens profiles, the apparatus comprising:

a first mold and a second mold disposed to face each other, having the lens substrate interposed therebetween, and the first mold comprising a first lens substrate facing surface corresponding to the lens profile of the lens element and the second mold comprising a second lens substrate facing surface corresponding to the lens profile of the lens element;

a molding unit which molds a lens element material injected between the first and the second molds into the lens element having the lens profiles; and a hardening unit disposed between the first and the second molds to harden the molded lens element, wherein the first mold comprises a base substrate, a first mold substrate disposed on a surface of the base substrate adjacent to the lens substrate, and a second mold substrate disposed on a surface of the base substrate adjacent to the lens substrate.

11. The apparatus of claim 10, wherein an alignment mark is formed on at least one of a substrate for the first mold and a substrate for the second mold for aligning with the lens substrate.

12. The apparatus of claim 10, wherein the first mold substrate comprises a first lens mold accommodating hole corresponding to the hollow hole of the lens substrate and a first lens mold disposed on a surface of the base substrate adjacent to the lens substrate and inserted and aligned in the first lens mold accommodating hole and the second mold comprises a base substrate, and the second mold substrate comprises a second lens mold accommodating hole corresponding to the hollow hole of the lens substrate and a second lens mold disposed on a surface of the base substrate adjacent to the lens substrate and inserted and aligned in the second lens mold accommodating hole.

13. The apparatus of claim 12, wherein a space between an outer surface of the first lens mold and an inner surface of the first lens mold has a shape corresponding to a shape of a first spacer portion of a completely formed micro lens.

14. The apparatus of claim 12, wherein a space between an outer surface of the second lens mold and an inner surface of the second lens mold has a shape corresponding to a shape of a second spacer portion of a completely formed micro lens.

15. The apparatus of claim 12, wherein the hardening unit is disposed to apply ultraviolet light onto the lens element from an outside of the lens element.

16. The apparatus of claim 15, wherein the hardening unit is disposed to apply ultraviolet light onto the lens element from a bottom surface portion of the first mold and a bottom surface portion of the second mold, substantially simultaneously.

17. A micro lens comprising:

a lens substrate comprising a hollow hole formed thereon; and a lens element comprising a first primary lens functioning portion and a second primary lens functioning portion, each penetrating through the hollow hole of the lens substrate and being formed at each end of the hollow hole, wherein diameters of the first and the second primary lens functioning portions are smaller than a diameter of the hollow hole of the lens substrate.

18. The micro lens of claim 17, wherein the lens substrate is integrally formed with the first and the second primary lens functioning portions and includes a spacer portion extending from at least one of the first and the second primary lens functioning portions to protrude in at least one direction from the lens substrate.

19. The micro lens of claim 17, wherein the lens element is made of ultraviolet (UV) curable polymer material.

20. A camera module comprising:
a plurality of micro lenses stacked one another; and
a wafer-level photographing device to process images input through the plurality of micro lenses,
wherein at least one of the plurality of micro lenses comprises a lens substrate with a hollow hole and a lens element formed penetrating through the hollow hole of the lens substrate, the lens element comprising a first primary lens functioning portion and a second primary lens functioning portion, each of which has a diameter smaller than a diameter of the hollow hole and is disposed at each end of the hollow hole, and a spacer portion which extends from at least one of the first primary lens functioning portion and the second primary lens functioning portion to protrude from at least one surface of the lens substrate, and the stacked plurality of micro lenses are spaced from one another by the spacer portion.

* * * * *